Patented Apr. 2, 1946

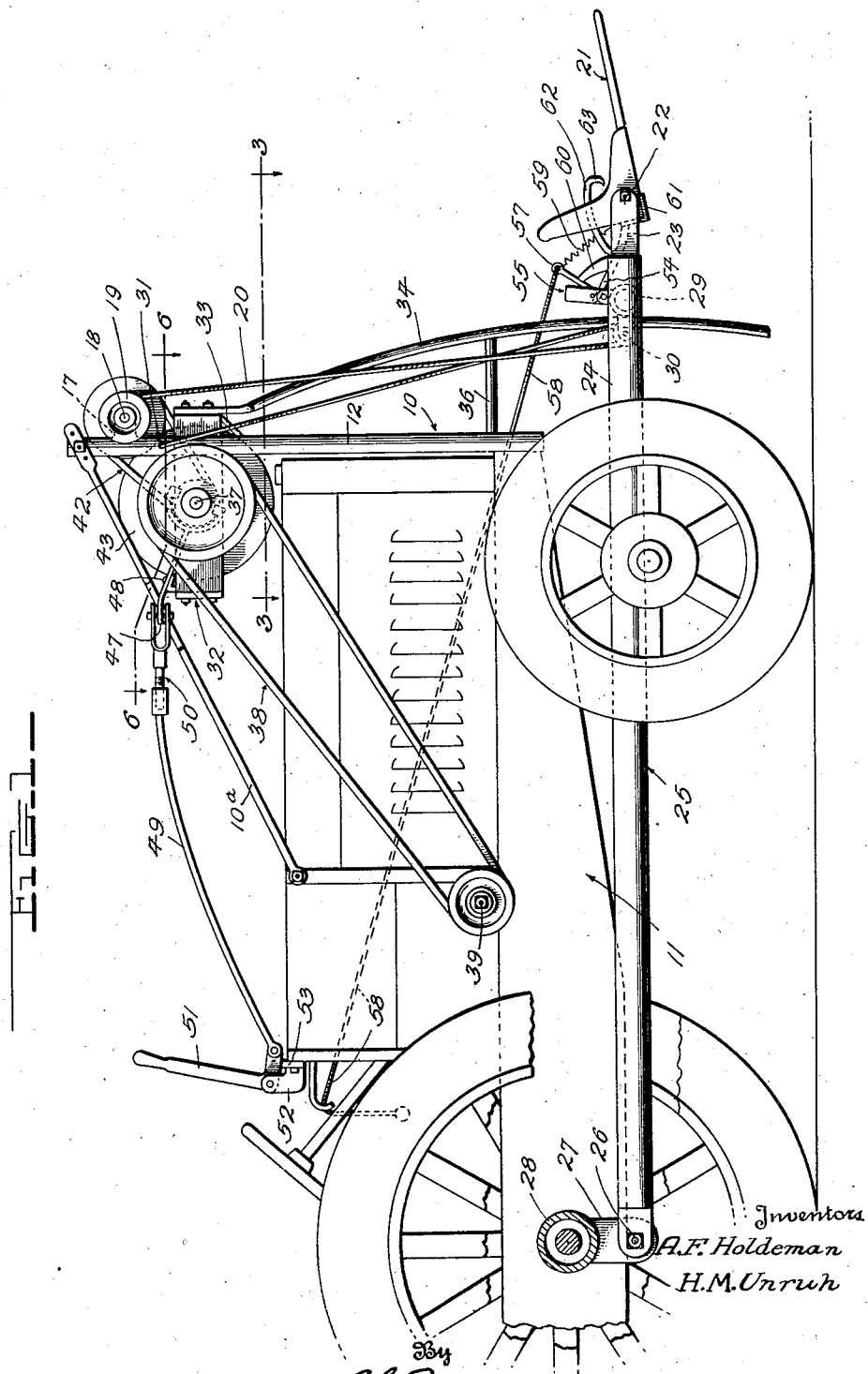

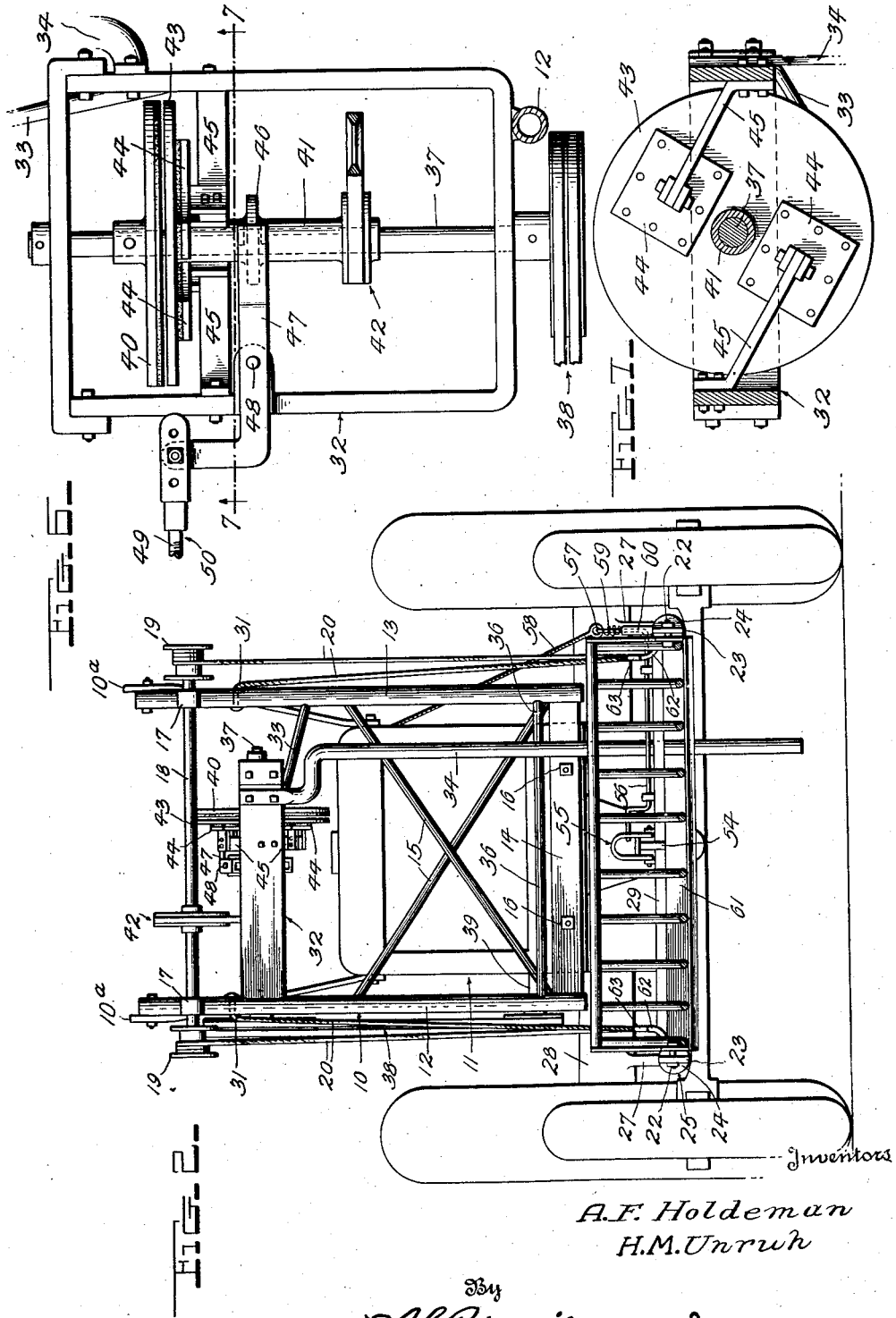

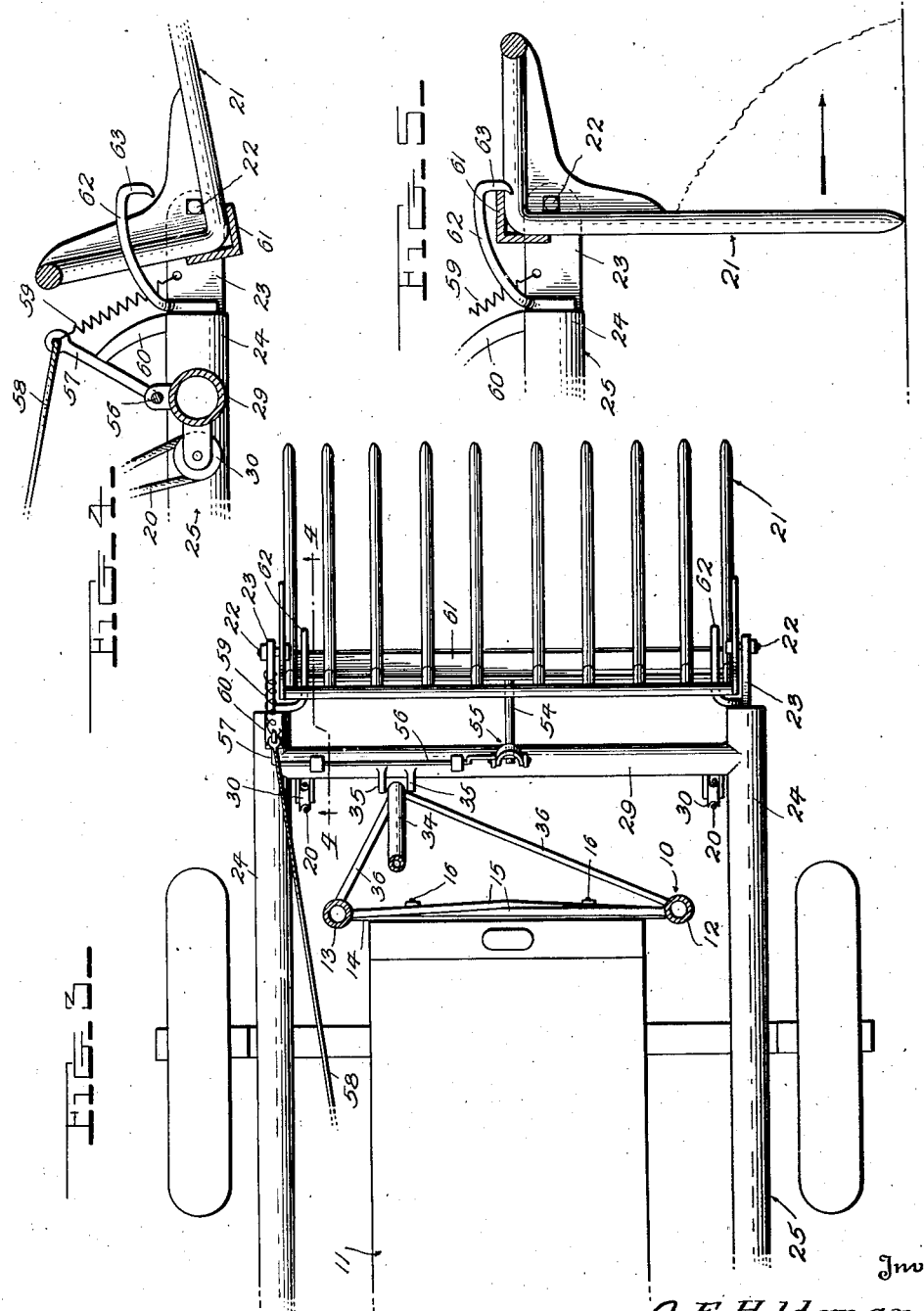

2,397,487

UNITED STATES PATENT OFFICE 2,397,487

LOADING ATTACHMENT FOR TRACTORS

Adin F. Holdeman and Harry M. Unruh,
Hesston, Kans.

Application April 4, 1944, Serial No. 529,496

3 Claims. (Cl. 214—140)

The invention relates to a new and improved tractor attachment designed primarily for taking manure from a pile, carrying it to a spreader and dumping it into the latter.

One object of the invention is to provide a relatively simple and inexpensive attachment, yet one which will be highly efficient and reliable.

Another object is to make novel provision whereby the manure handling fork of the attachment may be successfully used for pushing scattered manure back to the pile.

A still further aim is to provide an unusually simple and practicable mechanism for elevating the fork, holding said fork elevated when running the tractor to and from the spreader, and braking the descent of said fork whenever it is being lowered.

With the foregoing and minor objects in view, the invention resides in the novel subject matter hereinafter described and claimed, description being accomplished by reference to the accompanying drawings.

Fig. 1 is a side elevation partly broken away and in section showing a tractor equipped with the invention.

Fig. 2 is a front elevation with the fork tines in section.

Fig. 3 is a horizontal sectional view on line 3—3 of Fig. 1.

Fig. 4 is an enlarged detail vertical section as indicated by line 4—4 of Fig. 3, the fork being shown in its load lifting and carrying position.

Fig. 5 is a view similar to Fig. 4 but showing the fork in its dumped position and in use for pushing scattered manure back to the pile.

Fig. 6 is an enlarged horizontal sectional view substantially on line 6—6 of Fig. 1.

Fig. 7 is a vertical sectional view on line 7—7 of Fig. 6.

A preferred construction has been illustrated and will be rather specifically described, with the understanding, however, that within the scope of the invention as claimed, variations may be made. Moreover, while the invention will be described for the handling of manure, it is not limited to this use, and it will be understood that within the scope of said invention, a scoop could well be substituted for the fork.

A vertical U-shaped frame 10 is provided for attachment to the front end of a tractor 11, said frame having two laterally spaced vertical standards 12 and 13 rigidly secured to the ends of a horizontal bar 14, and suitably braced as at 15, preferably by crossed brace rods. In the present showing, attachment of the frame 10 to the tractor, is effected by bolting the bar 14 to the front end of the tractor frame, the bolts being shown at 16. The upper end portions of the standards 12 and 13 carry appropriate bearings 17 for a winch shaft 18, said winch shaft having two winches 19 in the present disclosure. These winches are cooperable with two cables 20 for raising and lowering the load as required. Frame 10 is braced at 10a.

The load-carrying fork is shown at 21, said fork being pivoted at 22 to extensions 23 projecting forwardly from the side arms 24 of a vertically swingable U-shaped frame 25, which frame straddles the body of the tractor and has the rear ends of its side arms 24 pivotally mounted at 26, for example, on lugs 27 welded to the rear axle housing 28 of the tractor. The cross member 29 of the frame 25 is disposed at the front end of said frame and carries two sheaves 30 under which the cables 20 are looped, the ends of said cables remote from the winches 19 being suitably anchored to the standards 12 and 13, as indicated at 31. When the winches 19 are driven, the cables 20 are wound to elevate the frame 25 and the fork 21, and when said winches are freed from the drive, said frame and fork lower by gravity.

A relatively small rectangular frame 32 is welded or otherwise suitably secured to the upper end portion of the standard 12, said frame 32 projecting both toward the standard 13, and rearwardly and being horizontally disposed. For stability, the frame 32 is rigidly tied to the standard 13 by a somewhat inclined bar 33 welded or otherwise rigidly secured to both said frame and said standard. The front bar of the frame 32 carries a vertical longitudinally curved guide bar 34 for the front end of the vertically swingable frame 25, the cross member 29 of this frame being provided with appropriate guide lugs or the like 35 straddling said bar 34. This bar is connected rigidly with the standards 12 and 13, by suitable brace rods 36. Obviously, the bar 34 and the lugs or the like 35 cooperate in preventing lateral swaying of the frame 25 during travel of the tractor over uneven ground, which is advantageous particularly when the fork is loaded and elevated.

The frame 32 carries a drive shaft 37 which is continuously driven by a belt drive 38 from the power take-off shaft 39 of the tractor 11, said shaft 37 having a clutch disk 40. Rotatably and slidably surrounding the shaft 37, is a sleeve 41 which is connected by a belt drive 42 to the winch shaft 18, for operating the latter. The sleeve 41 carries a clutch-and-brake disk 43 which is cooperable with the clutch disk 40 when said sleeve is slid endwise in one direction, to cause shaft 37 to drive said sleeve and thus drive the winch shaft 18. The disk 43 is also cooperable with two fixed brake shoes 44 carried by the frame 32, when the sleeve 41 is slid endwise in the other direction to separate said disk 43 from the disk 40, whereby the rotation of sleeve 41 and winch shaft 18 may be controlled during lowering of the frame 25 and fork 21. The disk 43 is also cooperable with the brake shoes 44 to hold the shaft 18 against rotation, after the load has been lifted, while the tractor is being driven to the spreader in readiness for load dumping. In the present showing, the shoes 44 are carried by two arms 45 rigidly secured to the side bars of the frame 32.

In the present showing, the intermediate portion of the sleeve 41 is provided with a peripheral flange 46 which is suitably engaged with a forked shifting lever 47, said lever being fulcrumed at 48 on the frame 32. The lever 47 is pivoted to the front end of a longitudinal rod 49 which preferably includes an adjustment 50, said rod extending rearwardly to a clutch-and-brake lever 51 suitably mounted on the tractor 11, for example, on an appropriate bracket 52 bolted to a suitable part of said tractor. The lever 51 is rearwardly swingable to effect shifting of the disk 43 into contact with the clutch disk 40, thus causing shaft 37 to drive sleeve 41 which in turn drives the winch shaft 18 to operate the winches 19 and cables 20 to lift the load. When the load is once lifted, lever 51 may be swung forwardly, thereby shifting sleeve 41 to separate disk 43 from the disk 40 and to engage said disk 43 with the brake shoes 44, thus holding the winches 19 against rotation and holding the loaded fork in raised position while driving the tractor to the spreader into which the load is to be dumped. After dumping of the load and return of the tractor to the pile being loaded, the brake means may be used to control the speed of descent of the fork 21 and frame 25, by properly operating the lever 51. When this lever is in the position which it occupies when the brake means is fully applied, said lever preferably occupies a position in which it is slightly past dead center with respect to the rod 49, and a suitable stop 53 is shown for limiting the movement of this lever to said position. Thus, when the loaded fork is once lifted and the lever 51 is forced forwardly to the extreme, the brake means will be applied to hold the load lifted, and will be held in fully applied condition while the tractor is being driven to the spreader.

The fork 21 is provided with a rearwardly projecting rigid arm 54 cooperable with a latch 55 mounted on the cross member 29 to hold said fork in load lifting and carrying position. For releasing the latch 55, I have shown a rock shaft 56 mounted on the cross member 29 and suitably connected at one end with said latch, the other end of said rock shaft having an arm 57 connected with the front end of a release cable 58 which extends to a point within reach of the driver. A spring 59 is employed to exert a forward pull on the arm 57, to hold the latch 55 engaged with the arm 54 until its release is desired, and to permit said latch to again snap into engagement with said arm 54 upon restoration of the fork to its load-lifting and carrying position. A stop arm 60 is shown on one of the side arms 24 of the frame 25 to limit the forward movement of the arm 57.

Provision is made for limiting the dumping movement of the fork 21 to such a position that, upon lowering of the frame 25, said fork may project directly down from said frame onto the ground, as seen in Fig. 5, permitting said fork to be used to push scattered manure back to the pile, simply by driving the tractor. In the present showing, the fork 21 includes a bar 61 having a portion which moves upwardly and forwardly during the dumping movement of said fork, and the front ends of the side arms 24 carry two forwardly projecting arms 62 overlying the bar 61, said arms having downwardly projecting fingers 63 which are struck by said bar 61 to limit the dumping movement of the fork.

From the foregoing taken in connection with the accompanying drawings, it will be seen that novel and advantageous provision has been made for carrying out the objects of the invention, and while preferred features have been illustrated, attention is again invited to the possibility of making variations within the scope of the invention as claimed.

We claim:

1. In a loading attachment for a tractor, a vertically swingable frame and means for mounting it on a tractor, raising and lowering means for said frame, a fork or the like pivoted to the front end of said frame to be forced under or into a pile of material by forward movement of the tractor, coacting means on said frame and said fork or the like for holding said fork or the like against dumping until desired, and additional coacting means on said fork or the like and said frame for limiting the dumping movement of said fork or the like to such a position that it will project directly down from said frame onto the ground when the frame is again lowered, said additional coacting means comprising a transverse bar secured to the fork or the like and rearwardly spaced from the pivot thereof, said bar being movable upwardly and forwardly as the fork or the like dumps, and a rigid arm rigidly secured to said frame and projecting forwardly over said bar, said rigid arm having a rigid downwardly projecting finger to be struck by said bar when said fork or the like reaches the aforesaid downwardly projecting position, whereby said additional coacting means will then prohibit rearward swinging of the fork or the like and the latter may be used to push scattered material back to said pile when the tractor is forwardly driven.

2. In a loading attachment for a tractor, a vertical frame including two laterally spaced standards, means for rigidly securing said frame to the front end of a tractor, a relatively small horizontal frame rigidly secured to one of said standards, said relatively small horizontal frame projecting both rearwardly from said one of said standards and laterally therefrom toward the other of said standards and terminating in spaced relation with the latter, a tie bar rigidly connecting said relatively small horizontal frame with said other of said standards, a winch shaft rotatably mounted on the upper ends of said standards, driving and braking means for said winch shaft including a short shaft, clutch means and brake means all mounted on said relatively small horizontal frame, a vertically swingable frame provided with load supporting means at its front end, means for mounting said vertically swingable frame on the tractor, lifting cables connected with said vertically swingable frame, and winches on said winch shaft for winding said cables.

3. In a loading attachment for a tractor, a frame and means for securing it to the front end of a tractor, load-lifting means including a winch mounted on said frame, driving and stopping means for said winch having an operating lever fulcrumed on said frame, a single manually actuated control lever and means for mounting it on said tractor in a position accessible to the driver, a longitudinal rod connecting said control lever with the aforesaid operating lever of said winch driving and stopping means, said control lever being swingable slightly past a dead center position with respect to said rod when moved to winch-stopping position, and stop means for then arresting the movement of said control lever, whereby the winch will be locked.

ADIN F. HOLDEMAN.
HARRY M. UNRUH.